United States Patent [19]
Karim et al.

[11] Patent Number: 5,384,723
[45] Date of Patent: Jan. 24, 1995

[54] METHOD AND APPARATUS FOR FLOATING POINT NORMALIZATION

[75] Inventors: Faraydon O. Karim, Round Rock; Christopher H. Olson, Austin, both of Tex.

[73] Assignee: International Business Machines Corporation, Armonk, N.Y.

[21] Appl. No.: 205,123

[22] Filed: Feb. 28, 1994

Related U.S. Application Data

[63] Continuation of Ser. No. 786,136, Oct. 31, 1991, abandoned.

[51] Int. Cl.6 .............................................. G06F 7/38
[52] U.S. Cl. .................................................... 364/748
[58] Field of Search .................... 364/748, 745, 715.04

[56] References Cited

U.S. PATENT DOCUMENTS

| | | | |
|---|---|---|---|
| 4,969,118 | 11/1990 | Montoye et al. | 364/748 |
| 4,977,534 | 12/1990 | Takahashi | 364/748 |
| 5,157,624 | 10/1992 | Hesson | 364/748 |
| 5,220,524 | 6/1993 | Hesson | 364/748 |

*Primary Examiner*—Tan V. Mai
*Attorney, Agent, or Firm*—Casimer K. Salys

[57] ABSTRACT

A method and apparatus for performing normalization of floating point numbers using a much smaller width register than would normally be required for the data operands which can be processed. As the registers are smaller, the number of circuits required to achieve the normalization is reduced, resulting in a decrease in the chip area required to perform such operation. The normalization circuitry was streamlined to efficiently operate on the more prevalent type of data being presented to the floating point unit. Data types and/or operations which statistically occur less frequently require multiple cycles of the normalization function. It was found that for the more prevalent data types and/or operations, the width of the registers required was substantially less than the width required for the less frequent data types and/or operations. Instead of expanding the register width to accommodate these lesser occurrences, the data is broken into smaller portions and normalized using successive cycles of the normalization circuitry. Thus, by sacrificing speed for the lesser occurring events, a significant savings was realized in the number of circuits required to implement normalization. As the slower speed operations occur infrequently, the overall performance of the normalization function is minimally impacted. Thus, considerable savings in integrated circuit real estate is achieved with minimal impact to the overall throughput of the system.

14 Claims, 4 Drawing Sheets

METHOD AND APPARATUS FOR FLOATING POINT NORMALIZATION

This is a continuation of application Ser. No. 07/786,136 filed Oct. 31, 1991, now abandoned.

TECHNICAL FIELD

This invention relates to a method and apparatus for performing certain floating point arithmetic operations in a data processing system. More particularly, the invention relates to an improved normalization method and circuitry which reduces the amount of die size required for normalization calculations.

BACKGROUND ART

Floating point apparatus allow for improvements in the amount of time a data processing unit takes to perform arithmetic calculations. An American national standard has been developed in order to provide a uniform system of rules governing the implementation of floating point systems. This standard, ANSI/IEEE Standard No. 754-1985 is hereby incorporated by reference as background material. The standard specifies basic and extended floating point number number formats, arithmetic operations, conversions between integer and floating point formats, conversions between different floating point formats, conversions between basic format floating point numbers and decimal strings, and the handling of certain floating point exceptions.

The typical floating point arithmetic operation may be accomplished in either single precision or double precision format. Each of these formats utilizes a sign, exponent and fraction/mantissa field, where the respective fields occupy predefined portions of the floating point number. In the case of a 32-bit single precision number the sign field is a single bit occupying the most significant bit position; the exponent field is an 8-bit quantity occupying the next-most significant bit positions; the mantissa field occupies the least significant 23-bit positions. In the case of a double precision floating point number the sign field is a single bit occupying the most significant bit position; the exponent field is an 11-bit field occupying the next-most significant bit positions; the mantissa field is a 52-bit field occupying the least significant bit positions.

Conventional techniques for performing floating point operations are achieved by utilizing three steps: (i) pre-alignment, (ii) arithmetic operation, and (iii) normalization (these techniques are used for 'addition-type' instructions, such as Add, Subtract, Compare, Muliply-Add, etc.; they are not generally used for such operations as Multiply or Divide). The pre-alignment step is used to align the mantissa portion of the floating point numbers to be operated upon, such that respective exponents are equal in value. Normally, the number having the larger exponent remains unshifted, whereas the number having the smaller exponent has its mantissa portion shifted to the right a number of bit positions corresponding to the difference between exponent values. For example, assume a binary representation of floating point A having an exponent of 5 (meaning 2 to the 5th power), needs to be added to a floating point number B having an exponent of 3 (meaning 2 to the 3rd power). The number B will have its mantissa portion shifted to the right two bit locations, and the exponent of B will be increased by two, such that both exponents are now five. Note that the numbers still maintain the same value as they originally had, but are merely represented in a different floating point internal representation.

After pre-alignment, the second step of conventional floating point arithmetic is performed. This step performs the arithmetic operation specified, such as addition, subtraction, multiplication, division, etc. Both the exponent and mantissa fields are operated upon.

The third traditional step is to normalize the data after the arithmetic operation. This step allows for maintaining the highest degree of precision of floating numbers, as is commonly known to those of ordinary skill in the art. In standard systems, this normalization is accomplished by counting the number of leading zeroes contained in the resultant mantissa field. This count is then subtracted from the exponent field, and the mantissa field is shifted left by a similar count amount, resulting in a one bit being in the most significant bit position of the mantissa field.

Numerous attempts have been made to improve the amount of time required to calculate/perform floating point operations. Conventional methods perform addition of addends, and then shift the resultant amount to remove leading zero-bits. Improved techniques determine an approximate shift amount by analyzing the addends during addition. This results in time savings. Another similar technique analyzes the fractional result for predicting when post-normalization and rounding can be eliminated.

Other techniques perform two operations in parallel, and choose one of the two resultants of these parallel operations. In a first path, the steps of pre-alignment and addition are performed. In the second parallel path, the steps of addition and post-normalization are performed. This is a performance improvement over the conventional method which does pre-alignment, addition, and post-normalization, as only two steps are performed in any given path. The two resultants are compared, at the end of the two parallel operations, to determine which resultant conforms to being normalized.

Other techniques anticipate leading zeros in parallel with the arithmetic unit, as disclosed in Hokenek, E. et al, "Leading-zero anticipator (LZA) in the IBM RISC System/6000 Floating-Point Execution Unit", IBM Journal of Research Development, Volume 34, No. 1, January 1990, and Montoye, R. et al, "Design of the RISC System/6000 Floating Point Execution Unit", IBM Journal of Research Development, Volume 34, No. 1, January 1990, both hereby incorporated by reference as background material. However, these techniques fail to accommodate large data paths in an efficient manner.

As data processing system's have grown in complexity, it has become necessary to increase the bus width, or data path, used to transfer information from one portion of the system to another. Original central processor units, or CPU's, had 4 and 8 bit bus widths. To increase system throughput, the bus widths have been increased in order to transfer more data in the same amount of time. This is desirable as, given a bus bandwidth that has a maximum transfer rate, only a given number of data exchanges can occur for a given time period. By increasing the width of the bus, more information can be transferred while maintaining a fixed bus bandwidth. As such, 16 bit buses such as the Intel 80286 microprocessor and 32 bit buses such as the Intel 80386 microprocessor, have become increasingly popular.

Even larger bus widths are easily envisioned to be forthcoming in the near future.

These increases in bus data width cause increases in the die size of the microprocessors, however. As the die size is proportional to the overall manufacturing cost of a given integrated circuit component such as a microprocessor, these higher bus width components result in a proportionally higher cost. Further, the amount of functionality that can be placed on the integrated circuitry is reduced for devices that support these larger bus widths. This is because a 32 bit register takes approximately twice the die surface area of a 16 bit register. As less functionality can be maintained in a given device having a large data path, more integrated circuit components are required to maintain a given functionality. Thus, for data processing systems having large bus widths, numerous integrated circuit components are required. This results in higher costs to the end user.

Another driving force in the data processing system is the desire to continually integrate more and more functionality into a given integrated circuit component. As an example, computers today are of similar size to that of calculators manufactured ten years ago. Further, as previously discussed, as the transfer rates across buses approach their upper limits, larger data paths are needed to increase system throughput and performance. These larger data path requirements run counter to the quest for greater integration, as larger data paths require more devices. There is a real need to provide increases in data path widths supported by an integrated circuit component without a corresponding increase in integrated circuit component size.

DISCLOSURE OF THE INVENTION

Disclosed is a method and apparatus for performing normalization of floating point numbers using a much smaller register width than would normally be required for the data operands which can be processed. As the register width is smaller, the number of circuits required to achieve the normalization is reduced, resulting in a decrease in the chip area required to perform such operation. The reduction in register width size was achieved by studying the characteristics of the incoming data and floating points operations to be performed on the data. The normalization circuitry was streamlined to efficiently operate on the more prevalent type of data being presented to the floating point unit. Data types and/or operations which statistically occur less frequently require multiple cycles of the normalization function. It was found that for the more prevalent data types and/or operations, the width of the registers required were substantially less than the width required for the less frequent data types and/or operations. Instead of expanding the register width to accommodate these lesser occurrences, the data is broken into smaller portions and normalized using successive cycles of the normalization circuitry. Thus, by sacrificing speed for the lesser occurring events, a significant savings was realized in the number of circuits required to implement normalization. As the slower speed operations occur infrequently, the overall performance of the normalization function is minimally impacted. Thus, considerable savings in integrated circuit real estate is achieved with minimal impact to the overall throughput of the system.

The above results are accomplished by comparing the exponential portions of the floating point numbers while the mantissa portions of the numbers are being arithmetically operated upon. The result of the exponent compare is used to pre-shift the result of the mantissa arithmetic operation by varying amounts up to 48 bits. This shifted result is then normalized using a 16 bit zero detect logic and a 16 bit shifter. These are physically very small circuits. At the end of this cycle, up to 64 bits (48 bits from the 1st stage and 16 bits from the next stage) of leading zeros are detected and shifted out of the mantissa. The possibility of the datum being normalized in this cycle is high, so that almost all data can be normalized in a single pass.

In the few cases where the leading zeros exceed 64 bits, the leading bit of the intermediate result being zero signals the need for additional normalization. The data will loop on the normalization cycle to achieve additional normalization. This costs one additional clock cycle for each 16 leading zeros beyond the first 64. In the preferred embodiment, the recycling is limited at 6 extra clocks, or cycles, to avoid infinite looping when a mantissa contains all zeros. Since the probability of needing an additional normalization cycle is cut in half with each successive iteration, needing more than one additional cycle is extremely rare. Thus, datums having bit lengths of up to 161 bits in the preferred embodiment are normalized using circuitry which doesn't require concurrent operation on the full datum.

It is an object of the present invention to provide an improved data processing system.

It is a further object of the present invention to provide a method and apparatus for supporting large data and/or bus paths.

It is yet another object of the present invention to provide a low cost solution for supporting large data paths in a data processing system.

It is a further object of the present invention to provide a method and apparatus for supporting large data and/or bus paths for floating point operations.

It is yet another object of the present invention to provide a low cost solution for supporting large data paths in a floating point processing unit.

It is yet a further object of the present invention to provide a low cost, high data width floating point unit without substantially sacrificing the speed, or performance of a data processing system.

It is yet another object of the present invention to provide improved normalization circuitry for a floating point unit.

BRIEF DESCRIPTION OF THE DRAWING

The foregoing and other objects, aspects and advantages of the invention will be better understood from the following Best Mode for Carrying Out the Invention with reference to the figures listed below, in which.

BEST MODE FOR CARRYING OUT THE INVENTION

Figure 1:
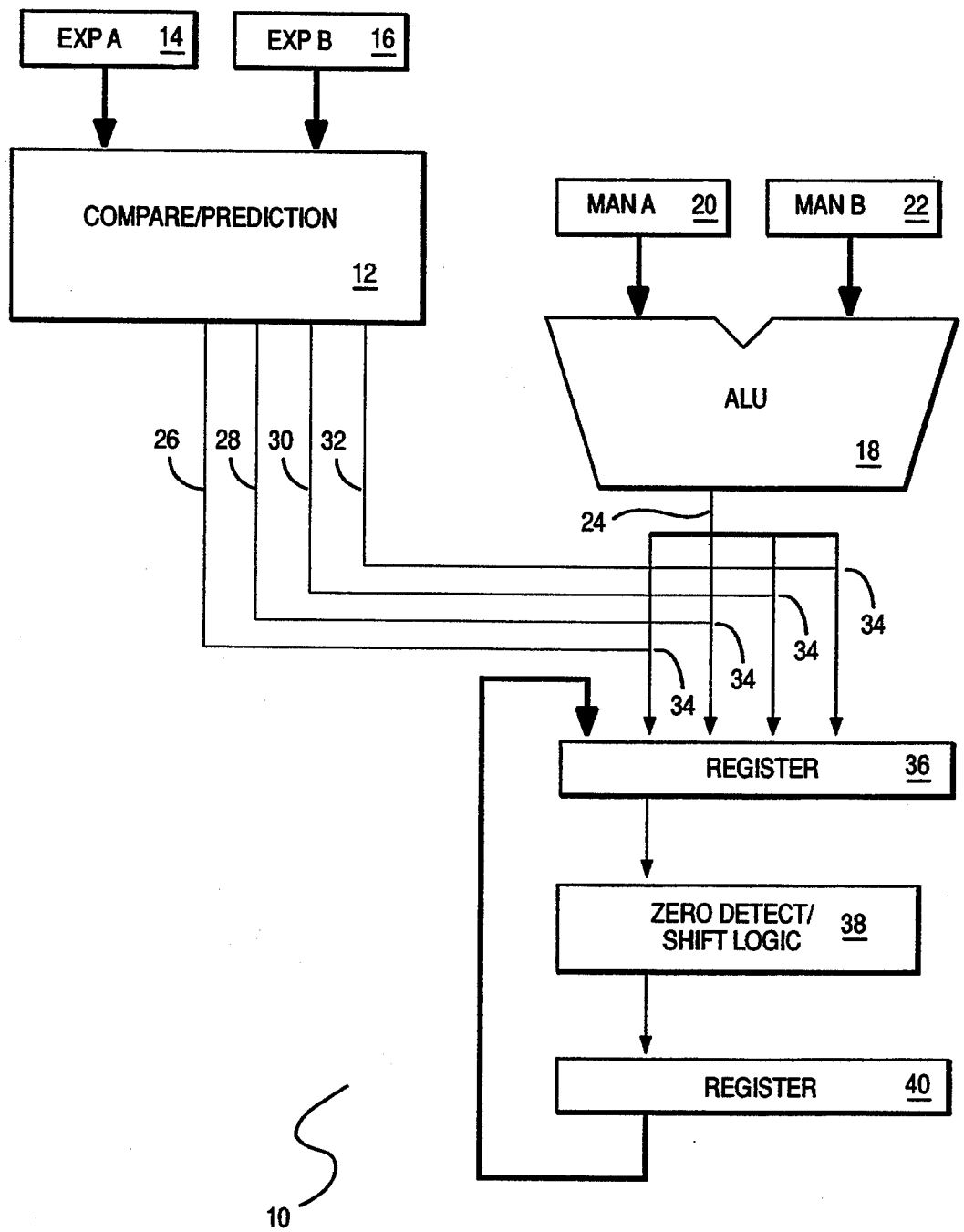
FIG. 1 is a functional block diagram of system flow and control.

FIG. 1 shows the functional block diagram of the preferred embodiment of this invention. A floating point post-normalization function 10 normalizes floating point numbers conforming to ANSI/IEEE Standard No. 754-1985. An exponent compare circuit 12 has inputs from two floating point numbers A and B to be operated upon upon. The A exponent is shown at 14 and the B exponent portion is shown at 16, both being inputs to the exponent compare circuitry 12. This circuitry is able to predict, within 1 bit of accuracy, whether the resultant mantissa portion 24 calculated by the arithmetic unit 14 will require shifting of 48, 32, 16, or 0 bits. Four control lines are generated by this prediction portion 12, and are shown at 26, 28, 30, and 32 to represent the need to shift 48, 32, 16 or 0 bits respectively. As can be seen, these control lines 26, 28, 30, and 32 are used to shift at 34 the mantissa result 24 by the determined amount, and store this amount in result register 36.

The mantissa result 24 is determined by the arithmetic unit 18, which operates on the mantissa portion of A at 20 and the mantissa portion B at 22 using conventional arithmetic circuitry commonly known to those of ordinary skill in the art. This result 24 is the portion of the floating point number requiring normalization, which entails shifting out leading/most significant zeros and incrementing the resultant exponent by 1 for each zero bit shifted. This normalization is desired to maintain the maximum degree of accuracy when operating on floating point numbers having dissimilar magnitudes.

The exponent compare circuitry at 12 is able to predict the number of leading zeros which will result in the mantissa operation, within 1 bit, because of the following. As is commonly known to those of ordinary skill in the art, the mantissa portions of A and B shown at 20 and 22 must be pre-aligned prior to performing 'addition-like' operations, so that the relative magnitudes of the numbers have some relationship to one another. As previously shown, the pre-alignment involves shifting in leading zeros into a mantissa and similarly changing the exponent portion to accommodate the shifted in values. The key feature of the exponent compare circuit at 12 is to analyze the initial exponent values of A and B prior to their being compensated due to the mantissa zero-fill. Thus, by looking at the difference between the exponents of A and B, it is readily apparent the number of zero's which will be filled into the most significant bit, and hence this information is available to shift the value at 24 without analyzing this value directly to count the number of leading zeros which must be eliminated during normalization. In other words, the original exponent values contain enough information to predict, within one bit, the number of leading zeros which the arithmetic unit output 24 will need to be shifted out for normalization.

Figure 2:
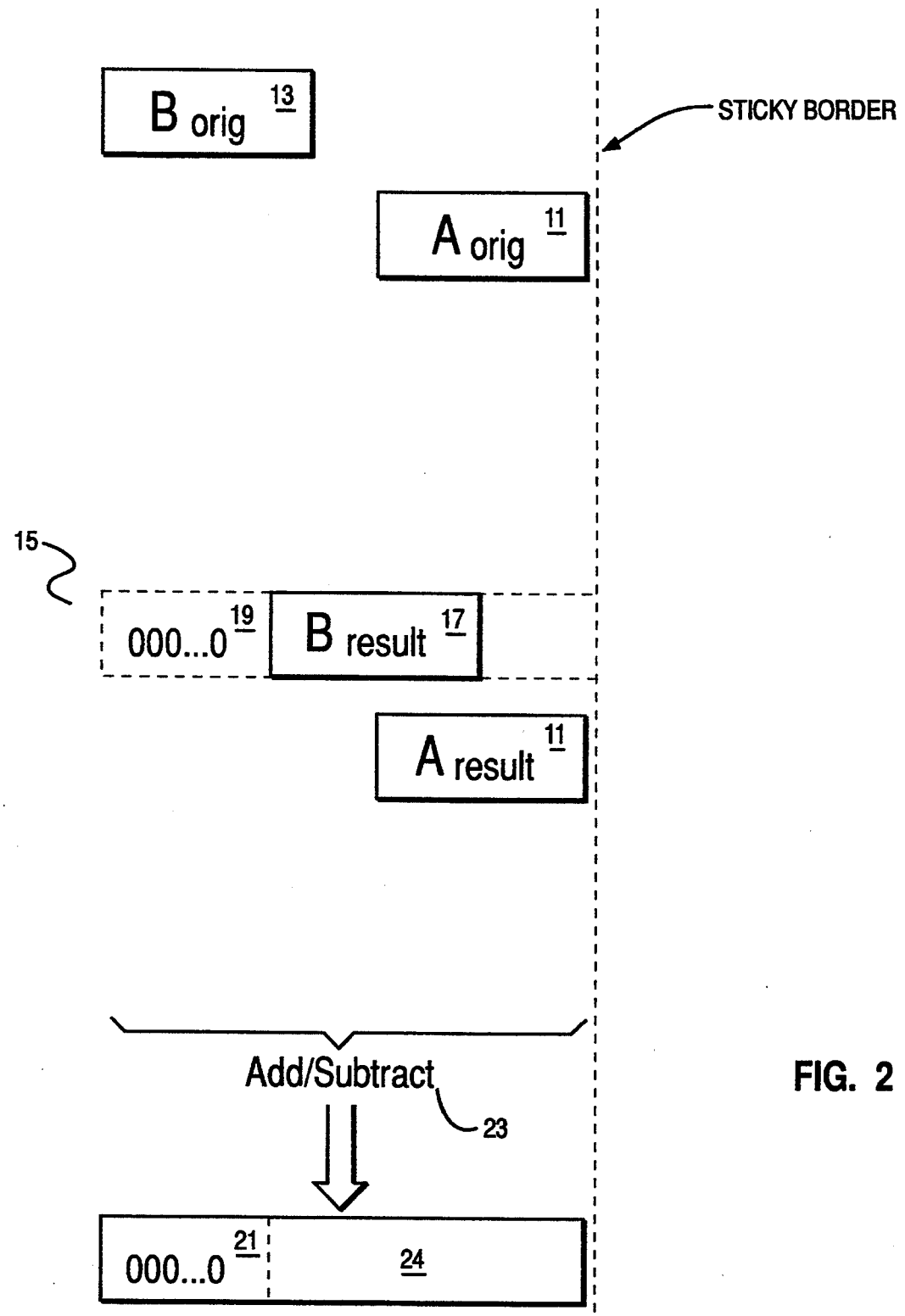
FIG. 2 is a diagram indicating zero-fill during pre-alignment.

This exponent compare is further exemplified with reference to FIG. 2. Original data mantissas A and B shown at 11 and 13, respectively, must be pre-aligned. Each of the mantissas similarly have a corresponding original exponent values, which are not shown. For pre-alignment, the B mantissa is shifted right until the exponents of A and B are equal, remembering that the exponent of B is decremented for each right shift of the mantissa of B. An example result is shown at 15, where the resultant B at 17 is shown to overlap A (which remained fixed), and has been zero filled from the left, as shown at 19, for a number of zeros equivalent to the difference between the original A and B exponent values. The result of the 'addition operation' 23 couples to block 24, which is an unnormalized result of the arithmetic operation. The number of leading zeros in this unnormalized result 24 is shown at 21, and will be +/−1 of being the same number of leading zeros shown at 19. The +/−one bit uncertainty is due to whether or not the arithmetic operation caused a carry-in/carry-out, or ripple, bit. Thus, by comparing the original exponent values of A and B which existed prior to the pre-alignment, an accurate prediction can be made as to the number of resulting leading zeros in the unnormalized result 24 without having to interrogate/read the actual mantissa result itself.

The above described exponent compare/leading zero prediction operation 12 is performed substantially simultaneously, or in parallel with, the arithmetic operations occurring in block 18. Thus, this additional step of comparing exponent values to allow for leading zero prediction incurs no time delays/penalties.

After studying the behavior of the arithmetic operations presented to the arithmetic unit 18 of FIG. 1, it was found that the majority of the data operations in the arithmetic unit 18 are done on normalized data. Therefore, the possibility of any resultant datum 24 being unnormalized is very low. All operations or multiply of divide on normal data result in normal data or unnormalized data by one bit only, the one bit discrepancy depending upon the carry in/carry out bit. Therefore, no huge normalization circuitry is required. All operations that result in effective subtract operations, i.e. an Add operation on two data with different signs, or subtracting two data with equal signs, may cause an unnormalized result. This is where the post normalization circuitry is required. However, even this scenario is minimized by the observation that for a Subtract operation to result in large numbers of leading zeros, two characteristics must exist: i) both exponent amounts for the two numbers must be equal, and ii) both mantissa portions for the two numbers must have the identical values for multiple leading bits. Otherwise, there will be no more than one leading zero bit in the worst condition. This is illustrated in Table 1.

TABLE 1

|  |  | MSB |  | LSB |
|---|---|---|---|---|
| MULTIPLE LEADING BIT BEING EQUAL | | | | |
|  | A exp | 1011 | A mant | 100011 |
|  | B exp | 1011 | B mant | 100001 |
|  | R exp | 1011 | R mant | 000010 |
| MULTIPLE LEADING BITS BEING DIFFERENT | | | | |
| i) | A exp | 1011 | A mant | 100011 |
|  | B exp | 1011 | B mant | 000011 |
|  | R exp | 1011 | R mant | 100000 |
| ii) | A exp | 1011 | A mant | 100000 |
|  | B exp | 1011 | B mant | 010000 |
|  | R exp | 1011 | R mant | 010000 |
| iii) | A exp | 1011 | A mant | 111111 |
|  | B exp | 1011 | B mant | 011111 |
|  | R exp | 1011 | R mant | 100000 |
| iv) | A exp | 1011 | A mant | 101010 |
|  | B exp | 1011 | B mant | 010101 |
|  | R exp | 1011 | R mant | 010101 |

As can be seen in TABLE 1, when the most significant bit (MSB) of the mantissa portions are different, only a single shift left is required for the worst case. It is only when numerous leading/most significant bits are equal in the mantissa that more than a single bit shift would be required to achieve normalization. These conditions show the extremely low probability of unnormalized datum 24 occurring from operations on normal data.

Because of the above, the data in the result register 36 is passed on to a sixteen bit zero detect and shift logic 38, where conventional techniques are used to determine the number of leading zeros, remove the leading zeros, and increment the exponent an amount corresponding to the number of leading zeros which were removed. These techniques are well known to those of ordinary skill in the art, as illustrated by U.S. Pat. No. 4,941,120 and hereby incorporated by reference. The results of this detect/shift logic 38 are shown at 40 as the normalized datum.

In the few cases where the leading zeros exceed 64 bits, the leading bit of the resultant datum 40 is used to determine if further normalization is required. If the leading bit of 40 is non-zero, no further normalization is required, as the purpose of normalization is to shift the datum bits until the most significant bit is a one. If the leading bit is zero, however, additional normalization is required. The datum 40 will loop on the normalization cycle to achieve additional normalization. This costs one additional clock cycle for each 16 leading zeros beyond the first 64. In the preferred embodiment, the recycling is limited at 6 extra clocks, or cycles, to avoid infinite looping when a mantissa contains all zeros. Since the probability of needing an additional normalization cycle is approximately cut in half with each successive iteration, needing more than one additional cycle is extremely rare. Thus, datums having bit lengths of up to 161 bits in the preferred embodiment are normalized using circuitry supporting less than 161 bits concurrently.

Figure 3:
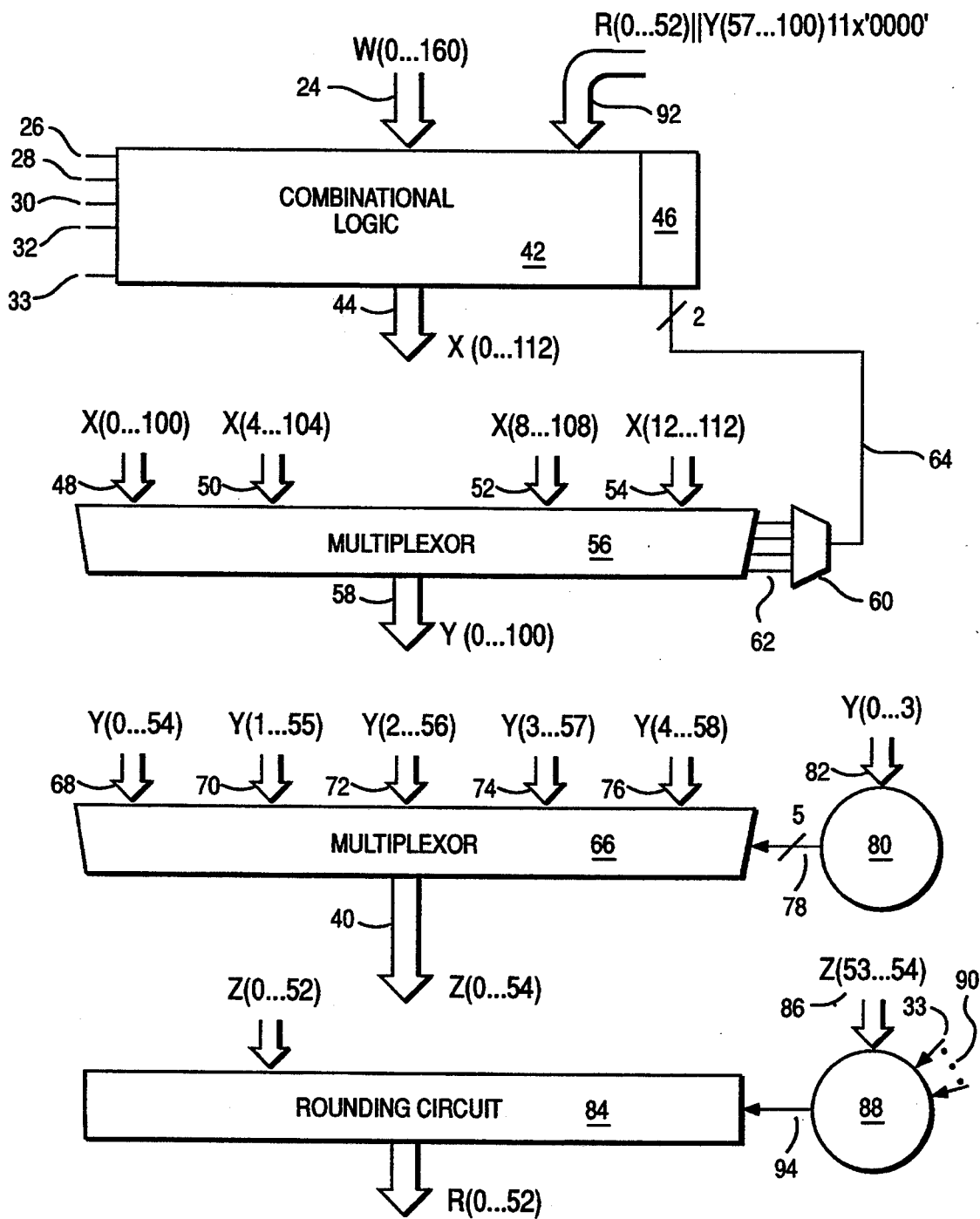
FIG. 3 is a detailed logical diagram of data flow and control.

The use control logic 26, 28, 30, and 32 in conjunction with the output of the arithmetic unit 18 as shown at 34 of FIG. 1 is further detailed in FIG. 3. At shown if FIG. 3, the arithmetic result 24 is 161 bits wide in the preferred embodiment, and is indicated as W(0 . . . 160). The data result is fed into a combinational logic circuit 42 which latches a result at 44, the latched result indicated as X(0 . . . 112), based upon the control signals 26, 28, 30, and 32. These control signals indicate whether the input W (0 . . . 160) should be shifted 48, 32, 16, or 0 bits respectively. X(0 . . . 112) is therefore the input value W(0 . . . 160) shifted by the number of bits as indicated by the control lines 26, 28, 30 and 32. X(0 . . . 112) is the number stored in the result register 36 of FIG. 1.

The specific details of the zero detect/shift logic 38 of FIG. 1 while now be further described with respect to FIG. 3.

A multiplex 56 of FIG. 3 has four groups of inputs 48, 50, 52, and 54, and 4 select lines 62 which indicate which of the four input groups to pass to the multiplexor output 58. The first input group 48 is comprised of bits 0–100 of X(0 . . . 112). The second input group 50 is comprised of bits 4–104 of X(0 . . . 112), or in other words, X(0 . . . 112) shifted left by four bit positions. The third input group 52 is comprised of bits 8–108 of X(0 . . . 112), or in other words, X(0 . . . 112) shifted left by eight bit positions. The fourth input group 54 is comprised of bits 12–112 of X(0 . . . 112), or in other words, X(0 . . . 112) shifted left by twelve bit positions. Control signals 62 are used to select which input group will be passed on at 58 to the next stage. These control signals 62 are generated by a conventional 2-4 bit decoder shown at 60. The input to this decoder 60 are control lines 64 which were generated by the logic at 46. This logic is a two-bit latch, and is determined by the most significant 12 bits of the resulting X(0 . . . 112). The two control lines thus have an encoded value indicating whether X(0 . . . 112) should be shifted 0, 4, 8 or 12 bits during the multiplexor stage 56.

The output of multiplexor 56 is shown at 58 to be Y(0 . . . 100), which now contains the hex-normalized portion of the original data W(0 . . . 160). In a manner similar to the second stage of FIG. 3, the third stage has a multiplexor 66 having five input groups 68, 70, 72, 74, and 76 and five select lines 78. The first input group 68 is comprised of bits 0–54 of Y(0 . . . 100). The second input group 70 is comprised of bits 1–53 of Y(0 . . . 100), or in other words, Y(0 . . . 100) shifted left by one bit positions. The third input group 72 is comprised of bits 2–54 of Y(0 . . . 100), or in other words, Y(0 . . . 100) shifted left by two bit positions. The fourth input group 74 is comprised of bits 3–57 of Y(0 . . . 100), or in other words, Y(0 . . . 100) shifted left by three bit positions. Finally, the fifth input group 76 is comprised of bits 4–58 of Y(0 . . . 100), or in other words Y(0 . . . 100) shifted left by four bit positions. Control signals 78 are used to select which input group will be passed on at 40 to the output. These control signals 78 are generated by a random logic 80, which is in turn driven by the four leading bits of Y(0 . . . 100), and which is indicated at 82 as Y(0 . . . 3). Conventional random logic 80 is used to generate control signals 78 based upon the definitions shown in Table 2.

TABLE 2

| | |
|---|---|
| Select_1: = | Y(0) = '1' |
| Select_2: = | Y(0 . . . 1) = '01' |
| Select_3: = | Y(0 . . . 2) = '001' |
| Select_4: = | Y(0 . . . 3) = '0001' |
| Select_5: = | Y(0 . . . 3) = '0000' |

As shown in Table 2, the first group 68 feeding multiplexor 66 will be selected if the most significant bit of Y is a one. The second group 70 of multiplexor 66 will be selected if the two most significant bits of Y are equal to '01'. Groups three through five are similarly selected based upon the most significant bits of Y. The resulting output indicated as Z(0 . . . 54), is the output value which has been selected by the random logic 80. This resulting output 40 is similarly shown in the functional diagram of FIG. 1. This output is further passed to a rounding circuit shown at 84, which is a conventional rounder not germane to the present invention.

The details of this iterative looping are further shown in FIG. 3. If iterative looping is determined to be necessary based on the leading bit of Z(0 . . . 54) being zero, control line 33 of block 42 is activated, signalling that a feedback cycle should occur. This signal 33 preempts the control signals 26, 28, 30, and 32, and indicates that block 42 should instead accept input latched at 92. The value contained in 92 consists of the most significant 53 bits out of the rounding circuit 84, indicated as R(0 . . . 52), concatenated with the least significant bits of output Y, indicated as Y(57 . . . 100), concatenated with sixteen binary zeros, indicated as x'0000' (i.e. four hex zeros). Again, this concatenated value is shown at 92 of FIG. 3. R(0 . . . 52) is guaranteed to be the most significant bits of Z(0 . . . 52) because the control signal 94 of block 84, which indicates whether to add a zero or one to the input value, is forced to a zero by logic 88. This is accomplished as one of the input signals 90 to logic 88 is the feedback control line 33. Again, the other input signals 90 are of no significance to the current invention, as they are used during normal, conventional, rounding operations which are outside the scope of this invention.

Now that the detailed flow and control is understood for feedback looping, reference should now be made to FIG. 1. For the first iterative loop, the resultant datum 40 is recycled to be stored in the result register 36. The detect/shift logic 38 then analyzes the most significant sixteen bits of this recycled result to determine the number of of leading zeros to remove. As this is only a sixteen bit detection circuitry, only leading zero locations in the most significant sixteen bits can be detected. The entire value stored in the result register is then shifted by an amount, not exceeding sixteen bits in the preferred embodiment, as determined by the zero detect logic. The result of this detect/shift is again stored at datum result 40. The most significant bit of this datum result 40 is again used to determine whether continued looping is required, in a manner as previously described. This looping of the resultant datum 40 through the detect/shift logic 38 continues, up to a maximum of six loops in the preferred embodiment, until the most significant bit of the datum result is non-zero. When this is achieved, the post-normalization function ends, as the resultant datum 40 has been properly normalized.

Figure 4:
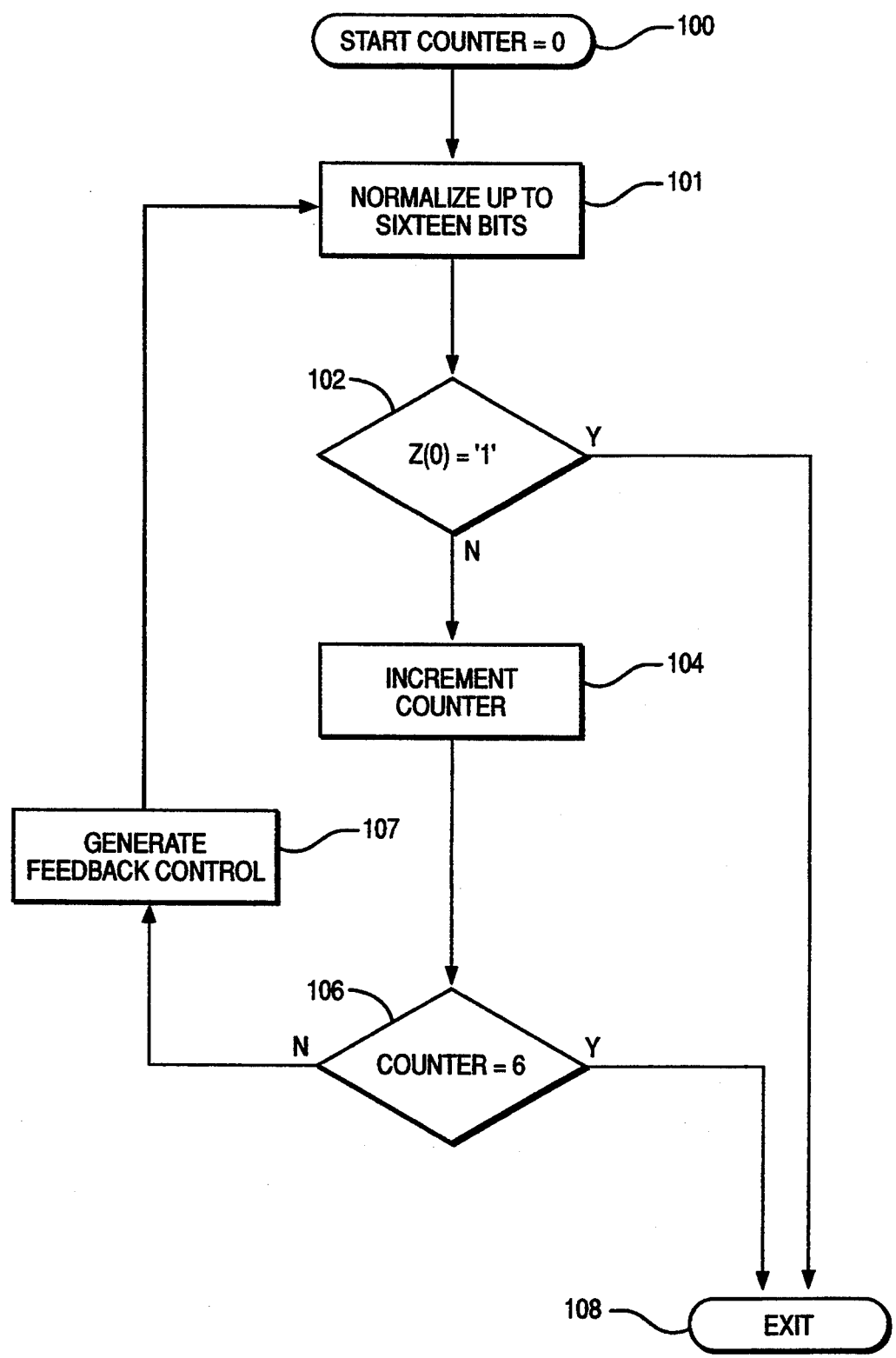
FIG. 4 is a state machine diagram for controlling the iterative looping for successive passes of normalization.

This looping methodology/logic is further illustrated by a state machine 100 in FIG. 4. At the beginning of this state machine 100, a three-bit counter is initialized. Then, the basic normalization as earlier described regarding block 38 of FIG. 1 occurs at 101 of FIG. 4. Following up to sixteen bits of normalization, a determination of whether additional normalization is required is made in block 102, using the most significant bit of Z. If the most significant bit is a logical 'one', no further normalization is required, and normalization ends at 108. This is the most frequently occurring path. If the most significant bit is a logical 'zero' at 102, a counter is incremented at 104. The counter is then tested at 106, using conventional logic circuits, to determine if the counter has yet reached at value of six, which in the preferred embodiment is encoded as binary '110'. If this maximum value is reached, control passes out of the state machine at 108 with the resultant datum Z residing at 40 of FIGS. 1 and 3. If the three-bit counter is less than the threshold value, the feedback control signal 33 of FIG. 1 is generated, indicating a need for looping the result 40 through the normalization process. This signal generation is conceptually shown to occur in block 107 of FIG. 4. This signal generation triggers a next successive pass through the normalization circuitry of FIG. 3 to generate a new value Z.

This iterative looping provides a way to incrementally normalize a number having a significant number of leading zeros without having to provide detection and shift circuitry which supports the entire data path/width concurrently. Thus, a reduction in the amount of circuitry is obtained at the expense of requiring multiple cycle times for normalizing these worst case numbers. As the occurrence frequency of these worst case numbers is low, a significant gain is made in circuitry reduction with minimal performance delay.

While the invention has been shown and described with reference to particular embodiments thereof, it will be understood by those skilled in the art that the foregoing and other changes in form and details may be made therein without departing from the spirit and scope of the invention.

We claim:

1. A method for normalizing floating point arithmetic results of arithmetic operations performed on floating point numbers A and B, said A and B each having at least an exponential portion and a mantissa portion, comprising the steps of:

comparing the relative magnitude of said exponential portion of A with said exponential portion of B, substantially simultaneously with performing an arithmetic operation on said mantissa portion of A and said mantissa portion of B, the mantissa portions being pre-aligned, to generate at least one normalization prediction control signal; and normalizing a result of said arithmetic operation in proportion to a difference in the relative magnitudes as specified by said at least one prediction control signal.

2. A method for normalizing a floating point arithmetic result of an arithmetic operation performed on floating point numbers A and B, said arithmetic result having N bit locations, comprising the steps of:

eliminating leading zero bit positions in X of N bit locations, where X is less than N;

shifting said arithmetic result in an amount not exceeding X bit locations; and successively looping, eliminating leading zero bit positions in said X locations, and shifting said arithmetic result, until said high order bit position is non-zero.

3. A method for normalizing a floating point arithmetic result of an arithmetic operation performed on floating point numbers A and B each having at least an exponential portion and a mantissa portion, comprising the steps of:

comparing the relative magnitude of said exponential portion of A with said exponential portion of B to generate at least one prediction control signal;

determining an arithmetic result using said mantissa portions of A and B;

eliminating leading zero bit positions of said arithmetic result, in an amount less than a total mantissa width, using said at least one prediction control signal;

shifting said arithmetic result in an amount not exceeding the number of leading zero bit positions eliminated; and successively looping, eliminating leading zero bit positions, and shifting said arithmetic result, until said high order bit position is non-zero.

4. A method for normalizing floating point arithmetic results of arithmetic operations performed by circuitry on floating point numbers A and B, said A and B each having at least an exponential portion and a mantissa portion, comprising the steps of:

comparing the relative magnitude of said exponential portion of A with said exponential portion of B, substantially simultaneously with performing an arithmetic operation on said mantissa portion of A and said mantissa portion of B, the mantissa portions being pre-aligned, to generate at least one normalization prediction control signal; and normalizing a result of said arithmetic operation in proportion to a difference in the relative magnitudes as specified by said at least one prediction control signal.

5. A method for normalizing a floating point arithmetic result of an arithmetic operation performed by circuitry on floating point numbers A and B, said arithmetic result having N bit locations, comprising:

eliminating leading zero bit positions in X of N bit locations, where X is less than N;

shifting said arithmetic result in an amount not exceeding X bit locations; and successively looping, eliminating leading zero bit positions in said X locations, and shifting said arithmetic result, until said high order bit position is non-zero.

6. A method for normalizing a floating point arithmetic result of an arithmetic operation performed by circuitry on floating point numbers A and B, said A and B each having at least an exponential portion and a mantissa portion, comprising:

comparing the relative magnitude said exponential portion of A with said exponential portion of B to generate at least one prediction control signal;

determining an arithmetic result using said mantissa portions of A and B;

eliminating leading zero bit positions of said arithmetic result, in an amount less than a total mantissa width, in proportion to a difference in the relative magnitudes as specified by said at least one prediction control signal;

shifting said arithmetic result in an amount not exceeding the number of leading zero bit positions eliminated; and successively looping, eliminating leading zero bit positions, and shifting said arithmetic result, until said high order bit position is non-zero.

7. A method for normalizing floating point arithmetic results of arithmetic operations, comprising the steps of:

receiving floating point numbers A and B each having at least an exponential portion and a mantissa portion;

comparing the relative magnitude of said exponential portion of A with said exponential portion of B, substantially simultaneously with performing an arithmetic operation on said mantissa portion of A and said mantissa portion of B, the mantissa portions being pre-aligned to generate at least one normalization prediction control signal; and normalizing a result of said arithmetic operation in proportion to a difference in the relative magnitudes as specified by said at least one prediction control signal.

8. A method for normalizing a floating point arithmetic result having N bit locations, comprising the steps of:

receiving said floating point arithmetic result;

eliminating leading zero bit positions in X of N bit locations, where X is less than N;

shifting said arithmetic result in an amount not exceeding X bit locations; and successively looping, eliminating leading zero bit positions in said X locations, and shifting said arithmetic result, until said high order bit position is non-zero.

9. A method for normalizing a floating point arithmetic result of an arithmetic operation, comprising:

receiving floating point numbers A and B, each having at least an exponential portion and a mantissa portion;

comparing the relative magnitude of said exponential portion of A with said exponential portion of B to generate at least one prediction control signal;

determining an arithmetic result using said mantissa portions of A and B;

eliminating leading zero bit positions of said arithmetic result, in an amount less than a total mantissa width, in proportion to a difference in the relative magnitudes as specified by said at least one prediction control signal;

shifting said arithmetic result in an amount not exceeding the number of leading zero bit positions eliminated; and successively looping, eliminating leading zero bit positions, and shifting said arithmetic result, until said high order bit position is non-zero.

10. A circuit for normalizing floating point arithmetic results of arithmetic operations, comprising:

means for receiving floating point numbers A and B each having at least an exponential portion and a mantissa portion;

means for comparing the relative magnitude of said exponential portion of A with said exponential portion of B, substantially simultaneously with performing an arithmetic operation on said mantissa portion of A and said mantissa portion of B, the mantissa portions being pre-aligned, to generate at least one normalization prediction control signal; and means for normalizing a result of said arithmetic operation in proportion to a difference in the relative magnitudes as specified by said at least one prediction control signal.

11. A circuit for normalizing a floating point arithmetic result having N bit locations, comprising:

means for receiving said floating point arithmetic result;

means for eliminating leading zero bit positions in X of N bit locations, where X is less than N;

means for shifting said arithmetic result in an amount not exceeding X bit locations; and means for successively looping, eliminating leading zero bit posit:ions in said X locations, and shifting said arithmetic result, until said high order bit position is non-zero.

12. A circuit for normalizing a floating point arithmetic result of an arithmetic operation, comprising:

means for receiving floating point numbers A and B, each having at least an exponential portion and a mantissa portion;

means for comparing the relative magnitude of said exponential portion of A with said exponential portion of B to generate at least one prediction control signal;

means for determining an arithmetic result using said mantissa portions of A and B;

means for eliminating leading zero bit positions of said arithmetic result, in an amount less than a total mantissa width, in proportion to a difference in the relative magnitudes as specified by said at least one prediction control signal;

means for shifting said arithmetic result in an amount not exceeding the number of leading zero bit positions eliminated; and means for successively looping, eliminating leading zero bit positions, and shifting said arithmetic result until said high order bit position is non-zero.

13. A method for normalizing a floating point arithmetic result of an arithmetic operation performed on floating point numbers A and B, said arithmetic result having N bit locations, comprising the steps of:

eliminating leading zero bit positions in X of N bit locations, where X is less than N;

shifting said arithmetic result in an amount not exceeding X bit locations; and successively looping, eliminating leading zero bit positions in said X locations, and shifting said arithmetic result, using a predetermined loop count value.

14. A method for normalizing a floating point arithmetic result of an arithmetic operation performed on floating point numbers A and B each having at least an exponential portion and a mantissa portion, comprising the steps of:

comparing the relative magnitude of said exponential portion of A with said exponential portion of B to generate at least one prediction control signal;

determining an arithmetic result using said mantissa portions of A and B;

eliminating leading zero bit positions of said arithmetic result, in an amount less than a total mantissa width, in proportion to a difference in the relative magnitudes as specified by said at least one prediction control signal;

shifting said arithmetic result in an amount not exceeding the number of leading zero bit positions eliminated; and successively looping, eliminating leading zero bit positions, and shifting said arithmetic result, using a predetermined loop count value.

* * * * *